United States Patent [19]

Weber et al.

[11] Patent Number: 5,572,713
[45] Date of Patent: *Nov. 5, 1996

[54] SYSTEM AND METHOD FOR OBTAINING CORRECT BYTE ADDRESSES BY USING LOGICAL OPERATIONS ON 2 LEAST SIGNIFICANT BITS OF BYTE ADDRESS TO FACILITATE COMPATIBILITY BETWEEN COMPUTER ARCHITECTURES HAVING DIFFERENT MEMORY ORDERS

[75] Inventors: Larry B. Weber, Palo Alto; Earl A. Killian, Los Altos; Mark I. Himelstein, San Jose, all of Calif.

[73] Assignee: Silicon Graphics, Inc., Mountain View, Calif.

[ * ] Notice: The term of this patent shall not extend beyond the expiration date of Pat. No. 5,398,328.

[21] Appl. No.: 379,710

[22] Filed: Jan. 27, 1995

Related U.S. Application Data

[63] Continuation of Ser. No. 127,105, Sep. 27, 1993, Pat. No. 5,398,328, which is a continuation of Ser. No. 564,923, Aug. 9, 1990, abandoned.

[51] Int. Cl.⁶ ........................................................ G06F 7/00
[52] U.S. Cl. .................. 395/500; 364/239.5; 364/252.6; 364/255.8; 364/260.4; 364/260.9
[58] Field of Search ................................................ 395/500

[56] References Cited

U.S. PATENT DOCUMENTS

| | | | |
|---|---|---|---|
| 4,109,310 | 8/1978 | England et al. | 395/425 |
| 4,215,402 | 7/1980 | Mitchell et al. | 395/400 |
| 4,931,925 | 6/1990 | Utsumi et al. | 395/775 |
| 4,959,779 | 9/1990 | Weber et al. | 395/775 |
| 4,999,808 | 3/1991 | Blahut et al. | 395/775 |
| 5,107,415 | 4/1992 | Sato et al. | 395/800 |
| 5,121,474 | 6/1992 | Sakamura | 395/800 |
| 5,132,898 | 7/1992 | Sakamura | 395/425 |
| 5,265,237 | 11/1993 | Tobias et al. | 395/500 |
| 5,398,328 | 3/1995 | Weber et al. | 395/500 |

*Primary Examiner*—Krisna Lim
*Attorney, Agent, or Firm*—Sterne, Kessler, Goldstein & Fox, P.L.L.C.

[57] ABSTRACT

A method and computer program-product for converting a program designed to be executed on a computer system employing a first predefined memory order, such as the Big Endian architecture, to a program which is executable on a computer system employing a second predefined memory order, such as the Little Endian architecture. The method and computer program-product uses the fact that performing a logical operation on the lower two bits of a byte address in one architecture converts that byte address to the equivalent byte address in the other architecture. The method and computer program-product are implemented in software by scanning the instructions of the input for load and store instructions. The software modifies the instructions by taking the contents of the register and operating on the two least significant bits of the byte address with a logical operation to generate two complementary bits used to replace the two least significant bits of the byte address to generate a new byte address that corresponds with the other architecture.

11 Claims, 3 Drawing Sheets

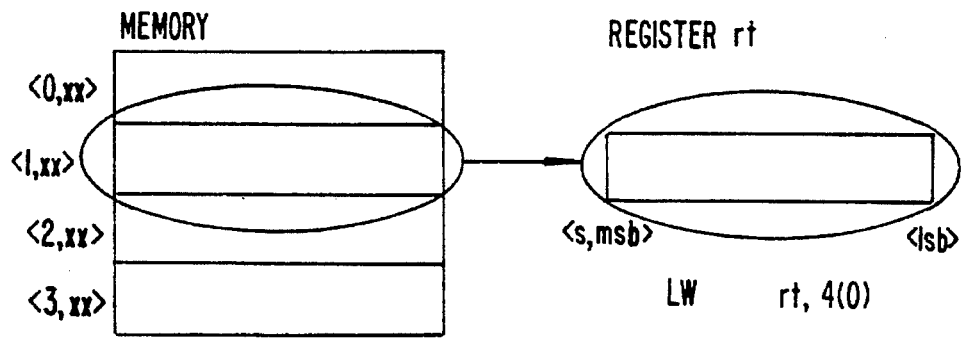
FIG. 1.
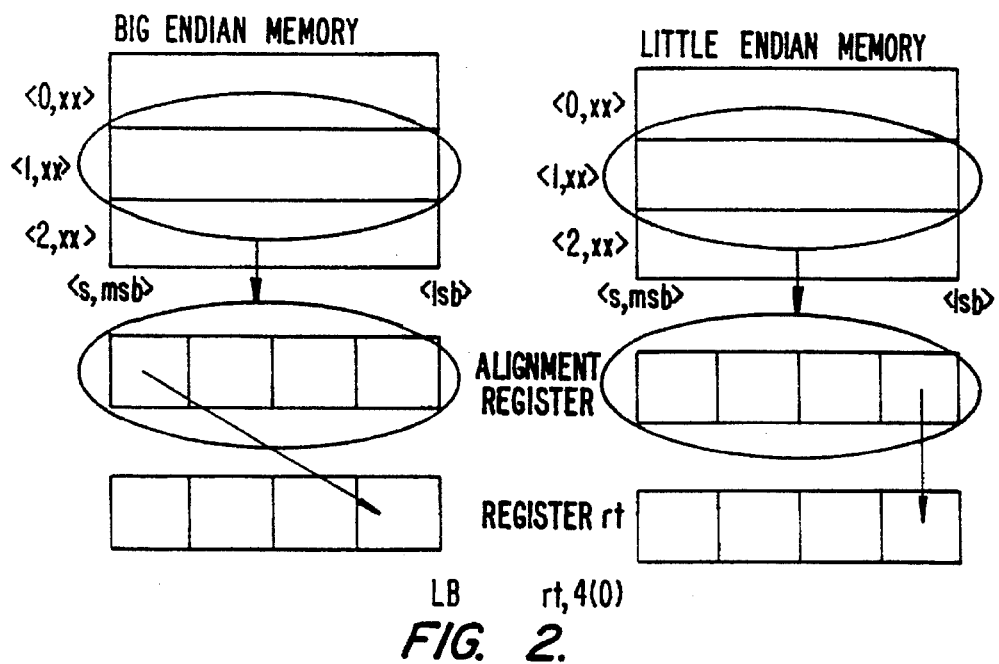
FIG. 2.
| BIG ENDIAN | 00 | 01 | 10 | 11 |
|---|---|---|---|---|
| | M | I | P | S |
| LITTLE ENDIAN | 11 | 10 | 01 | 00 |
$\langle s, msb \rangle$      $\langle lsb \rangle$
| LOW TWO BITS | $\langle s, msb \times lsb \rangle$ | | LOW TWO BITS XOR 3 |
|---|---|---|---|
| 00 | M | S | 11 |
| 01 | I | P | 10 |
| 10 | P | I | 01 |
| 11 | S | M | 00 |
FIG. 3.

| MACHINE 1 | MACHINE 2 |
|---|---|
| LB   rt, 0(sp) | LB   rt, 3(sp) |
| LB   rt, 1(sp) | LB   rt, 2(sp) |
| LB   rt, 2(sp) | LB   rt, 1(sp) |
| LB   rt, 3(sp) | LB   rt, 0(sp) |

| LB   rt, OFFSET(sp) | BASE REGISTER KNOWN TO BE WORD ALIGNED | LB   rt, OFFSET(sp) |
|---|---|---|
| LB   rt, 0(rs) | OFFSET IS ZERO, BASE ALIGNMENT UNKNOWN | XOR  at, rs, 3<br>LB   rt, 0(at) |
| LB   rt, OFFSET(rs) | NEITHER ALIGNMENT KNOWN | LA   at, OFFSET(rs)<br>XOR  at, at, 3<br>LB   rt, 0(at) |

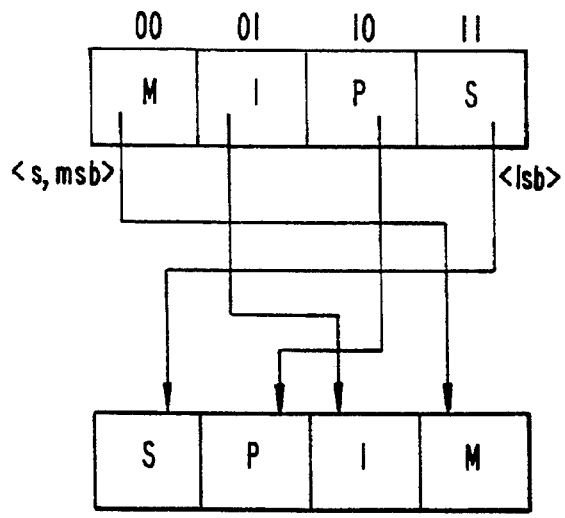

```
LW    rt, OFFSET(BASE)
SRL   r1, rt, 24
SLL   r2, rt, 24
SRL   r3, rt, 8
AND   r3, 0xff00
AND   rt, 0xff00
SLL   r4, rt, 8
OR    r5, r1, r2
OR    r6, r3, r4
OR    r7, r5, r6
SW    r7, OFFSET(BASE)
```

FIG. 7.

| MIN | MAX | DESCRIPTION |
|---|---|---|
| 30% | 30% | OF ALL INSTRUCTIONS ARE MEMORY OPERATIONS |
| 10% | 5% | OF ALL MEMORY OPERATIONS HAVE A DATA CACHE MISS |
| 6 | 6 | CYCLE PENALTY TO REFILL THE MISSED CACHE LOCATION |
| 20% | 40% | OF ALL MEMORY OPERATIONS ARE PARTIAL LOADS OR STORES |
| 80% | 60% | OF ALL PARTIAL MEMORY OPS USE SP, GP OR ARE ABSOLUTE |
| 2 | 2 | INSTRUCTIONS ARE ASSUMED TO BE REQUIRED TO FIX UP THE OP |
| 1.19 | 1.09 | PROGRAM TIME INCLUDING CACHE REFILL TIMES |
| 2.0% | 8.8% | PERFORMANCE PENALTY |

FIG. 8.

SYSTEM AND METHOD FOR OBTAINING CORRECT BYTE ADDRESSES BY USING LOGICAL OPERATIONS ON 2 LEAST SIGNIFICANT BITS OF BYTE ADDRESS TO FACILITATE COMPATIBILITY BETWEEN COMPUTER ARCHITECTURES HAVING DIFFERENT MEMORY ORDERS

This is a continuation of application Ser. No. 08/127,105, filed Sep. 27, 1993, now U.S. Pat. No. 5,392,329; which is a continuation of application Ser. No. 07/564,923, filed Aug. 9, 1990, now abandoned.

BACKGROUND OF THE INVENTION

This invention is in the field of digital computers. In a preferred embodiment, a method and apparatus for enabling a computer to run programs which utilize either of at least two different byte orders is disclosed.

It is known that different computer systems organize the words of data in their memories differently. Some computers store words of data with the least significant bit residing at the lowest address. Such machines have the so-called "Little Endian" ("LE") architecture. Other computers store data with the most significant bit (or, in some cases, the sign bit) residing at the lowest address. These machines have a "Big Endian" ("BE") architecture. Numerous articles describe these data organization systems in greater detail. One such article is Cohen, "On Holy Wars and a Plea for Peace," *Computer*, 10/81, pp. 48–54.

Whether a machine is BE or LE makes little difference within that particular machine. Although each architecture has its proponents, the consensus appears to be that both architectures are equally advantageous.

The use of two architectures presents a problem when machines of different architectures must interact or when software written for one type of machine is run on a machine of a different type. In these situations, data or programs stored in one machine according to one architecture would be misinterpreted by a machine of a different architecture. Additionally, instructions which access or manipulate parts of data words will have greatly different results.

The incompatibility between little-and big-endian machines has generated numerous attempts to improve interoperability. Most of these attempts have resulted in a hardware apparatus, usually comprised of a combination of shift registers and various logic gates. Although such hardware may allow both BE and LE instructions to operate, the hardware adds to the computer systems' complexity and reduces its speed. Both of these results are undesirable.

SUMMARY OF THE INVENTION

The present invention, in one of its embodiments, corrects the known disadvantages of the prior art by providing a software module, compatible with most microprocessors, which allows a BE program to run on a LE machine and vice versa.

The module is part of the operating system software and utilizes the fact that for computer words containing four bytes of data, XORing the low two bits of the address of one word with binary 3 results in addressing the desired byte for a machine of opposite byte order. Although the discussion of the invention herein only describes its operation with 4 byte words, the invention could be used with words having a different number of bytes.

Both a software and hardware implementation of the present invention are possible. Although a software implementation requires no additional or special hardware, it does run slower than a hard-wired apparatus to perform the same function. Therefore, in some circumstances, a hardware implementation of the present invention would be desirable. In the hardware implementation, a bit in one register is set or unset to indicate big or little endianess. The bit indicates that the endianess of certain part-word instructions must be changed.

The invention is described in detail below with reference to the following illustrations in which:

BRIEF DESCRIPTION OF THE DRAWINGS

FIG. 1 shows the process of loading a word from memory;

FIG. 2 shows how a "Load Byte" instruction recalls different bytes depending on the type of machine running the instruction;

FIG. 3 shows how byte order can be transposed using an XOR instruction;

FIG. 7 shows how to swap the memory locations of the bytes in a word; and

FIG. 8 is a chart showing the possible machine overhead required to emulate byte orders.

DESCRIPTION OF THE SPECIFIC EMBODIMENT(S)

Figures 4, 5, 6:
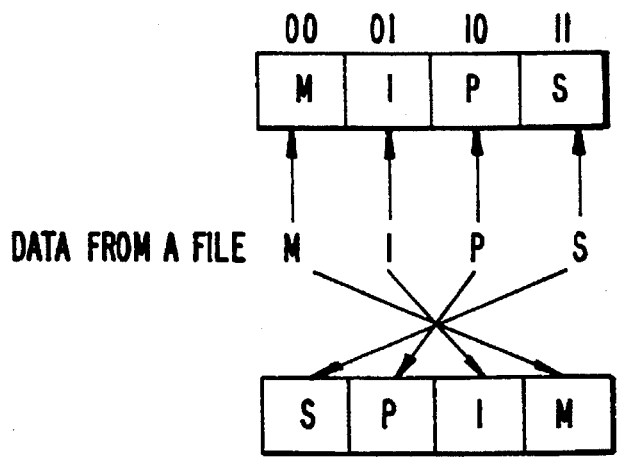
FIG. 4 shows how changing the offset of a machine can change the nature of the machine.
FIG. 5 shows how transferring data from a file depends on byte order.
FIG. 6 shows how loads for one type of machine can be converted into loads for a different type of machine.

The present invention allows a single computer to run programs intended for either BE or LE order. A simple technique called endian switching allows one computer to mimic a computer of different byte order with a minor performance overhead.

Most computers are word addressed machines. Data is accessed in words, not parts of words, under average conditions. Two machines of different byte order are quite similar with respect to words. Data is stored in words and machine operation is the same between big and little endian machines with regard to operations using or referencing words. A program that only references words would run on a machine of either byte order.

This principle is demonstrated by the load word instruction shown in FIG. 1, which instruction is for a LE machine. The same load word instruction would function in the identical manner if a BE machine was used. In this description, an address will be represented by a pair of symbols comprising a word address followed by a two bit byte address.

The difference between BE and LE machines is shown herein by the interpretation of the lower two bits of the address when using byte memory operations. A LE machine selects the 8 bits that include the least significant bit ("LSB") when the address has 00 as the lower two bits. A BE machine selects the 8 bits that contains the most significant bits ("MSB") when using the same address bits. In some BE machines, the byte selected would include the sign bit for the data.

FIG. 2 shows a load byte operation for both a BE and LE machine. In the figure, the word that contains the desired byte is extracted from memory using only the word address and is placed in an alignment register. In both machines, a reset-time set_endian flag, which is initialized during power-up routines, is used to indicate what type of machine is being used and which 8 bits are to be placed in the LSB position in the register. As shown in the figure, the BE memory places the sign and most significant bit into the lowest byte address and the LE memory places the least significant bit in the same place.

FIG. 3 illustrates the principle that by using the two low order address bits to number the bytes starting from either the least significant bit ("LSB") or most significant bit ("MSB"), either a BE or LE machine can be created. In the illustrated example, the byte addressed by the low two bits 00 for the BE machine contains an 'M' and the two high bits 11 address a byte containing an 'S'. For the LE machine, the situation is exactly reversed—the byte addressed by 00 contains an 'S' and the byte addressed by 11 contains an 'M'. As illustrated, exclusive OR-ing ('XORing') the byte address used by either machine with "11" (binary 3) results in the correct byte address to access the same data using the opposite data ordering convention. FIG. 4 further shows how the two types of machine are really quite similar in that merely changing the offset of a given address can make a given machine act like a machine of a different byte order. .It should also be noted that the offsets for different machines are, in this example, mirror images of each other.

Initially, treating BE and LE machines as identical with respect to words may appear incorrect. In general, it is known that both a BE and LE machine can read from the same ASCII file, with problems occurring when the machines exchange word length binary data. When consecutive bytes are written to a file the results for both types of machine follow expectations. However, when the set of bytes is treated as a single word, the results are often incorrect. These discrepancies can be explained by knowing that each machine's Input/Output ('I/O') system knows how to disassemble words into a string of bytes. All I/O operations are character oriented. Each system and machine has built into it the means to assemble and disassemble words as part of its I/O apparatus. FIG. 5 shows a string of characters in a file 15 and how those characters are mapped into a word by a BE machine 20 and a LE machine 25. As the figure illustrates, it is the combination of how the processor extracts bytes from a word and how the I/O system assembles and disassembles words that establish whether a machine is BE or LE.

Emulation of Byte Order

As the previous discussion indicates, proper byte order treatment is controlled by two things: the interpretation of the low address bits and the I/O rules for translating between a byte stream and a word in memory. If both these issues can be addressed in either hardware or software, a machine can be created which runs a program in either byte order.

The first convention, the interpretation of the low address bits, is implemented in software as part of the computer in a preferred embodiment of the present invention and relies on the observation of that byte addresses in one byte order can be made to simulate those of the other byte order by XORing the two low order bits of the first byte order with binary three. The software to perform this task functions at or after the program's compilation time. For example, the computer containing the present invention for inverting the byte order can read the program to be loaded and adjust each partial word memory reference to account for the different convention of how bytes are packed in a word.

Three standard types of byte addressing instructions must be accommodated in a conversion program to change or rearrange byte order consistently. These cases are illustrated in FIG. 6.

In case 1, it is known that the base register is always aligned on a word. In this case, the calculation of the new base address is performed by the system compiler, which merely XORs the offset with binary 3 to give the proper displacement.

In the second case, there is zero or no offset, and the base alignment is unknown. When bytes are addressed in this manner, the value in the base register is XORed with binary 3. The result is used as the correct offset.

Where neither the base alignment or the offset alignment is known, the three instructions shown in FIG. 6 (C) are used to address the correct byte in the new order. These instructions run very fast, so performing the extra instructions hardly impacts the system's performance.

All three cases, as stated, deal with the proper interpretation of the low address bits. Although the preferred embodiment of the present invention uses software to accomplish these address conversions, a hardware modification to the system processor could accomplish the same aim. Some processors permit the byte order of the processor to be set at system reset time. In this case, it is relatively simple to adjust the machine's byte order on a program (task) to program basis, using a user mode program. The easiest way to do this is to define a bit in the status register that indicates whether to run the new process in the same or different byte order as the byte order specified in either the previous program or at the last reset. Setting this flag would effectuate, for the duration of the new program, a universal shift in byte order. When this technique is implemented in hardware, the system notes that the bit indicating a different "endianess" has been turned on. Instructions which access parts of words are not altered. Instead, the 32 bit address bus has a branch pathway. 30 bits of the address are placed in a load aligner register. The remaining two bits are XORed with binary 3 to obtain the correct byte address. The 30-bits and 2-bits are then recombined in the load aligner. This method does not degrade the system's performance as the program is operating exactly as it would have had the reset time flag been set to the indicated byte order. These operations will only occur if the system is both in user mode and the reverse endian bit is on. The instructions affected include the load and store instructions.

The second convention, conversion of words into and from byte streams in the I/O system, is also accomplished in software in the preferred embodiment. By uniformly word swapping every buffer of data that is read or written to, the machine's built-in convention can be accommodated. Word swapping is the operation of exchanging the two outer bytes and the two inner bytes (switch bytes 0 and 3 and switch bytes 1 and 2). Word swapping and the code necessary to implement it are shown in FIG. 7.

Implementation of an Endian Switcher

Several alternate methods of implementing both described conventions are possible. As many machines will not have the hardware modifications discussed herein for byte order emulation, pure software emulation will also be considered.

If we assume that the computer on which both LE and BE programs are to run has no hardware modifications, a conversion program could be used. The program would word swap both the program and the initialized data. Also, the code would need to be "rewritten" to address partial words properly. The modifications could be done when the program is entered into the machine and the altered program can be stored in its translated form.

In an environment comprising a network of dissimilar byte order machines, if we wish to execute any program on any machine, the byte order cannot be fixed prior to execution. In this case, the program will be modified as part of its execution, the conversion occurring as the program is moved into the system memory. The execution time of the conversion program is small, and the amount of work to modify partial word memory operations is also relatively small. If the machine has the earlier noted hardware modification to interpret the low two bits in an address, the only program modification needed is to word swap the program and initialized data. If the word swapping is delayed until the application program is actually loaded (word swapping on demand) the machine overhead required for the conversion process is amortized over the entire running time of the program.

Differences between BE and LE machines related to the serialization of bytes of data in the I/O system are handled when data is read from or written to the output buffer. All the data in the output buffer is word swapped just after reading or just before writing the physical I/O from or to the disk.

Operating Systems Support

The operating system must be able both to emulate the opposite byte order and to emulate the system assumptions of the program being run. This can require both a compatible system call vector and, possibly, conversion of the data structure being passed. Every binary load module has its byte order encoded at the beginning of the module. This informs the operating system of the actions needed to emulate the program's system assumptions.

Similarities between UNIX systems make many of the operating system interfaces of other systems relatively easy to support. If there are incompatible elements in the system call vector, these can be dealt with in several ways. The operating system can identify a binary number of a different "endianess" and select a separate vector. If there are no or only a few overlaps in the assigned system calls, the entry to the opposite endian system call can change the data structure being passed (if any) and branch into the original system call.

Programs are stored as files in a byte order that assumes that the input/output mechanism converts the character data into words. Therefore, the organization of the program must be changed before the program is executed. As described, this is relatively easy, as every instruction in the load module and every initialed data word will be swapped. One reason the bytes are switched is because the network interface is byte oriented and intrinsically swaps words when moving from BE to LE and back. Compensation is thus needed.

FIG. 8 shows an estimate of the impact of simulating the opposite byte order in software. As earlier stated, the hardware extension incurs no performance cost during the computational part of the program as the program runs exactly as it would on a machine of the other byte order. As shown in FIG. 8, the range of the software penalty is 2–8.8%. Converting the input/output buffers will also cause a certain loss of performance. This is on the order of 11.7% longer to read and word swap a file than to just read the file.

Conclusion

The software shown and discussed in the description enables a program to be run on either an LE or BE machine. Data exchange between systems of different byte orders, including data stored on disk or memory is not within the specific teachings of this invention, but the teaching herein would be helpful in solving the problems presented by those transfers.

The present invention has now been described in detail, in the context of a specific embodiment. Nothing herein should be taken to limit this invention to the particular embodiment discussed, as numerous variations and modifications are possible while remaining within the scope of this disclosure. Given these possibilities, this invention should not be considered in a narrow, restrictive sense, but rather in a broad, expansive sense.

We claim:

1. A method for converting a program designed to be executed on a computer system employing a first predefined memory order to a program which is executable on a computer system employing a second predefined memory order different from said first predefined memory order, the method comprising the steps of:

finding all instructions in the program which operate on bytes of data, each of said bytes of data having a byte address, each byte address having two least significant bits;

operating on the two least significant bits of each byte address using a logic function to thereby generate two complementary bits for each byte address; and replacing the two least significant bits of the byte address with two complementary bits to thereby generate a new byte address for each of said bytes of data.

2. The method of claim 1 further comprising the step of detecting whether the program is designed to be executed on a computer system employing the first predefined memory order.

3. The method of claim 2 further comprising the step of detecting the two least significant bits of each byte address.

4. The method of claim 1 wherein the first predefined memory order comprises big endian order and the second predefined memory order comprises little endian order.

5. A computer system employing a first predefined memory order which converts and executes programs designed to be executed on computer systems employing a second predefined memory order different from said first predefined memory order, comprising:

means for finding all instructions in the program which operate on bytes of data, each of said bytes of data having a byte address, each byte address having two least significant bits;

means for operating on the least two significant bits of each byte address using a logic function to thereby generate two complementary bits for each byte address; and means for replacing the least two significant bits of each byte address with the two complementary bits to thereby generate a new byte address for each of said bytes of data.

6. The computer system of claim 5 further comprising:

means for detecting whether the program is designed to be executed on a computer system employing the first predefined memory order; and means for detecting the two least significant bits of each byte address.

7. The computer system of claim 5 wherein the first predefined memory order comprises big endian order and the second predefined memory order comprises little endian order.

8. A computer program-product storage device readable by a computer system, tangibly embodying a computer program-product comprising instructions executable by the computer system to perform method steps for converting a program designed to be executed on a computer system employing a first predefined memory order to a program which is executable on a computer system employing a second predefined memory different from said first predefined memory order, the method comprising the steps of:

finding all instructions in the program which operate on bytes of data, each of said bytes of data having a byte address, each byte address having two least significant bits;

operating on the two least significant bits of each byte address using a logic function to thereby generate two complementary bits for each byte address; and replacing the two least significant bits of the byte address with two complementary bits to thereby generate a new byte address for each of said bytes of data.

9. The computer program-product storage device of claim 8, wherein said method further comprises the step of detecting whether the program is designed to be executed on a computer system employing the first predefined memory order.

10. The computer program-product storage device of claim 8, wherein said method further comprises the step of detecting the two least significant bits of each byte address.

11. The computer program-product storage device of claim 8, wherein the first predefined memory order comprises big endian order and the second predefined memory order comprises little endian order.

* * * * *